United States Patent [19]

Gorden

[11] 4,015,189
[45] Mar. 29, 1977

[54] SUPPLEMENTAL FIELD EXCITATION FOR PERMANENT MAGNET ROTOR OF PILOT EXCITER

[75] Inventor: Dale I. Gorden, North Versailles, Pa.

[73] Assignee: Westinghouse Electric Corporation, Pittsburgh, Pa.

[22] Filed: Mar. 15, 1976

[21] Appl. No.: 666,810

[52] U.S. Cl. .................................. 322/46; 322/25; 322/59; 310/181

[51] Int. Cl.² ..................................... H02P 9/14

[58] Field of Search ............... 322/25, 28, 46, 59; 310/181

[56] References Cited

UNITED STATES PATENTS

| | | | |
|---|---|---|---|
| 2,666,886 | 1/1954 | Harding et al. | 322/46 X |
| 2,722,652 | 11/1955 | Brainard | 322/46 X |
| 3,396,325 | 8/1968 | Hopkins | 322/46 |
| 3,705,331 | 12/1972 | South et al. | 322/25 X |

Primary Examiner—Robert J. Hickey
Attorney, Agent, or Firm—G. H. Telfer

[57] ABSTRACT

In a synchronous dynamoelectric machine having a pilot exciter which energizes a brushless exciter, voltage regulation and forcing excitation are provided by a plurality of field coils which are disposed upon selected ones of a plurality of permanent magnets carried by the rotor of the pilot exciter. The field coils are connected together to constitute a field winding and are electrically connected to receive direct current excitation from the output of a rotating rectifier assembly through coupling means, such as a direct current regulator. In operation, the regulator is responsive to changes in the current flowing through the field winding of the synchronous dynamoelectric machine and provides a direct current output signal to the permanent magnet field winding to increase the magnetic field strength of the associated permanent magnets.

2 Claims, 2 Drawing Figures

SUPPLEMENTAL FIELD EXCITATION FOR PERMANENT MAGNET ROTOR OF PILOT EXCITER

BACKGROUND OF THE INVENTION

1. Field of the Invention:

The present invention relates to excitation systems for synchronous dynamoelectric machines, and more particularly to means for supplementing the excitation provided by a pilot exciter in combination with a conventional brushless exciter.

2. Description of the Prior Art:

Brushless excitation systems are now widely used for supplying direct current field excitation to synchronous dynamoelectric machines such as large alternating current generators. Such brushless excitation systems include an alternating current exciter having a stationary field structure and a rotating armature member. A rotating rectifier assembly is carried on a common shaft with the exciter armature and is connected thereto to provide a direct current output. The output of the rectifier is connected to the field winding of the main generator which also rotates with the exciter armature and rectifier. In this way, an excitation system is provided which requires no sliding contacts.

In conventional arrangements, the main exciter for a synchronous dynamoelectric machine comprises an alternating current generator having its armature mounted on the same shaft as the field winding of the synchronous machine and also having a stator field winding which must be energized by direct current to create a magnetic field so that a voltage will be induced in a rotating armature of the exciter. In well known arrangements, the direct current excitation for the main exciter is provided by a pilot exciter having a permanent magnet rotor turned by a prime mover within an annular armature winding to produce excitation power for the main exciter.

The generated voltage of the main exciter depends upon the rate of change of flux linkages with the AC exciter armature winding and the AC exciter field winding. The fluxes depend on the reluctances of the iron portions of the magnetic circuits as well as of the air gaps of the main exciter. It will therefore be appreciated by those skilled in the art that magnetic saturation of the armature and stator core may appreciably influence the generated voltage of the exciter. The generated voltage of such an exciter may be characterized generally as a non-linear function of the field excitation. Because of this non-linear relationship, the armature voltage is a generally decreasing non-linear function of the armature current flowing in the armature winding. For most known applications, it is desirable that corrective measures be taken to compensate for the non-linear effects of the iron core saturation to provide a substantially constant armature voltage output which is independent of changes in the armature current of the exciter.

Regulating schemes are known for controlling directly the level of direct current excitation applied to the main exciter stator field winding. Such arrangements are generally responsive to changes of the time rate of change of the voltage and current in the output of the main turbine generator. Although such arrangements are generally satisfactory, there remains interest in providing improved regulating systems.

SUMMARY OF THE INVENTION

In accordance with the present invention, means are provided for supplementing the excitation provided by the pilot exciter of a brushless excitation system for a synchronous dynamoelectric machine.

In conventional synchronous dynamoelectric machines which are energized by a combination of a pilot exciter and a main exciter, base excitation and forcing excitation for the main exciter field winding is provided by the permanent magnet pilot exciter to force the output of the main synchronous generator in response to transient loads. The pilot exciter operates at nominal power output levels to provide base excitation for a rated voltage output of the main synchronous generator. However, because of the forcing excitation requirement, the pilot exciter must be rated to provide as much as 2-½ times the base level excitation when the main synchronous generator is responding to transient loads.

It has been customary to increase the size of the permanent magnet assembly in the pilot exciter to obtain sufficient forcing power to achieve faster response time. The speed of response of the synchronous generator to a transient load is directly proportional to the strength of the magnetic field of the permanent magnet assembly of the pilot exciter, the field strength being directly proportional to the mass of the permanent magnets. Thus, in order to achieve higher levels of speed of response, a larger permanent magnet pilot exciter assembly must be provided. However, this may require a basic change in the mechanical arrangement of the brushless exciter system because of space limitations. The diameter of the permanent magnet generator rotor must be increased greatly to achieve a significant increase in the magnetic field output of the permanent magnet rotor. On some machines, a blower provided for ventilation purposes is located on the permanent magnet hub of the pilot exciter and is presently extended to its maximum permissible diameter consistent with permissible dynamic loading. Furthermore, even if no blower were required, a larger permanent magnet assembly would require larger bearings and a stronger supporting structure. Thus, there exists a need for means operable to supplement the excitation provided by the pilot exciter to provide faster speed response without increasing the size of the permanent magnet assembly of the pilot exciter.

In the present invention, the field strength of the permanent magnets of the pilot exciter is strengthened by adding a plurality of field coils to selected ones of the permanent magnets. The field coils are connected together in series electrical relation to constitute a field winding. The field winding is energized by direct current excitation which is derived from the output circuit of the rotating rectifier assembly which is associated with the brushless exciter. In a preferred embodiment of the present invention, the direct current excitation is derived from the rotating rectifier assembly by coupling means such as a direct current regulator having an input circuit which is connected across the output circuit of the rotating rectifier assembly and having an output circuit connected to conduct direct current through the permanent magnet field winding. The regulator is operable to provide direct current excitation for the permanent magnet field coils which is proportional to a predetermined function of the main exciter field excitation for voltage regulation purposes. By this arrangement, supplemental direct current excitation is provided to permit operation of the synchronous dynamoelectric machine at a power level exceeding its base operating level during transient loading conditions. Base excitation and forcing excitation is provided in the usual manner by the pilot exciter, with increased forcing excitation and improved voltage regulation being provided by the magnetic field generated by the permanent magnet field coils.

BRIEF DESCRIPTION OF THE DRAWINGS

While the specification concludes with claims particularly pointing out and distinctly claiming that which is regarded as the present invention, the organization, the advantages, and further objects of the invention may be determined from the following detailed description when read in conjunction with the accompanying drawings, in which:

DESCRIPTION OF THE PREFERRED EMBODIMENT

Figure 1:
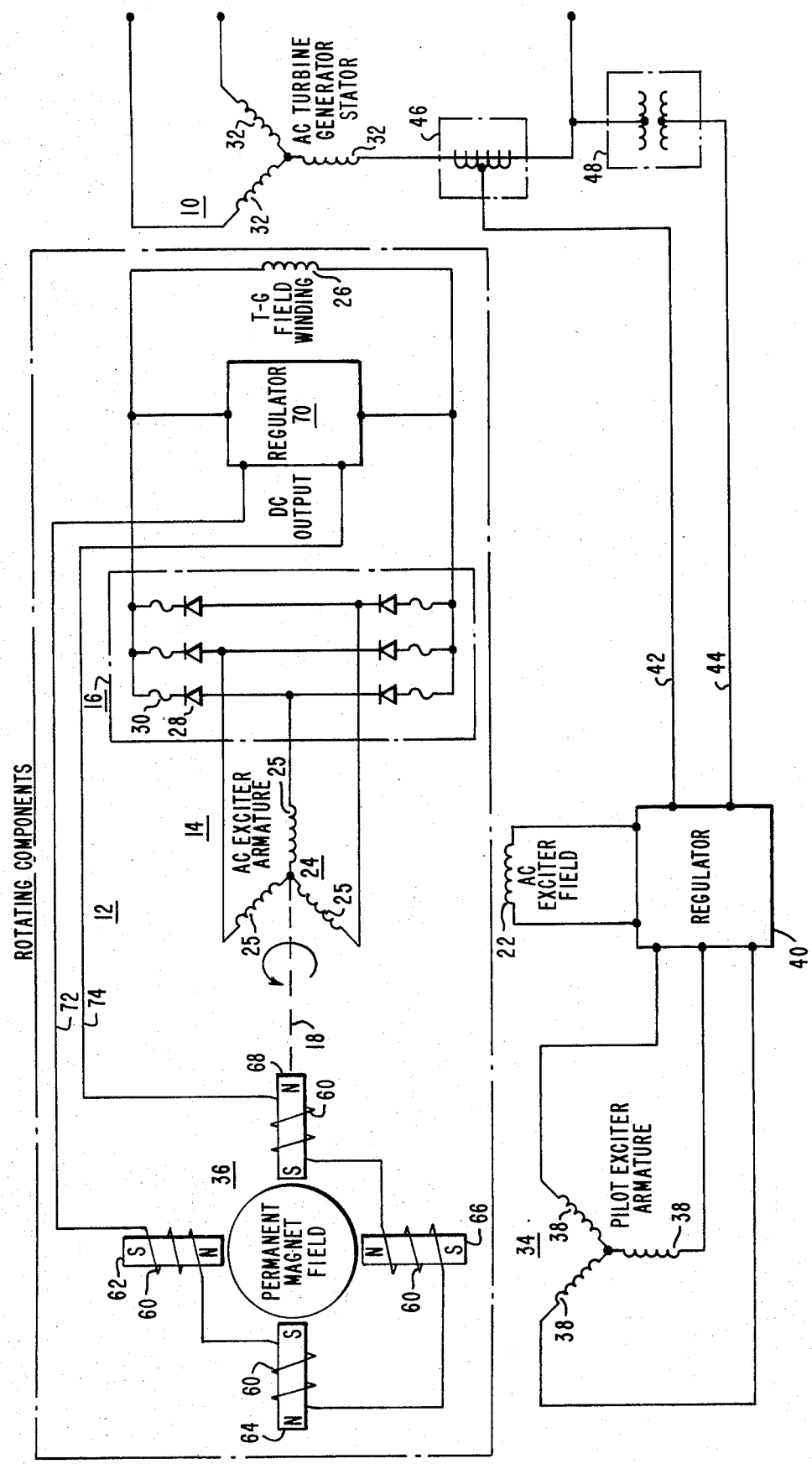
FIG. 1 is a block diagram of a synchronous dynamoelectric machine and a brushless excitation system which incorporate the present invention.

Referring now to FIG. 1 of the drawings, the invention is shown in combination with a synchronous dynamoelectric machine 10 and a brushless excitation system 12 having an alternating current exciter 14 and a rotating rectifier assembly 16 mounted on a common shaft 18 for concurrent rotation by a prime mover (not shown). The alternating current exciter 14 may be of any suitable type having a stationary stator field member 22 and a rotating armature member 24, the armature member 24 of the exciter 14 comprising a three phase winding 25 disposed within a core (not shown) carried on the shaft 18 so as to be rotatable with a main rotor field winding 26 of the synchronous dynamoelectric machine 10. The armature winding 25 is connected to the rotating rectifier assembly 16 having a plurality of rectifiers 28 and fuses 30 connected in a conventional bridge arrangement to provide direct current output for excitation of the field winding 26. The direct current excitation flowing through the rotor field winding 26 establishes a magnetic field which induces current flow within a stator armature winding 32 of the synchronous generator 10 when the rotating components of the brushless excitation system are caused to rotate by the prime mover.

The main exciter 14 receives its field excitation from a pilot exciter 34 which includes a permanent magnet field member 36 which is mechanically connected to the shaft 18 for rotation by the prime mover. As the shaft 18 rotates, the magnetic field established by the permanent magnet field member 36 is rotated within an annular armature winding member 38 in which alternating current is induced by magnetic induction in the usual manner. The output of the pilot exciter armature winding 38 is connected to a regulator 40 which may be of any suitable construction which is operable to convert the three phase electrical power generated by the pilot exciter to direct current excitation for energizing the main AC exciter field winding 22. It is preferred that the output of the regulator 40 be responsive to a predetermined function of a voltage signal 42 from the synchronous dynamoelectric machine stator armature winding 32, and a current signal 44 which is also derived from the stator armature winding 32. The voltage signal 42 may be derived by means of a potential transformer 46 and the current signal 44 may be derived by means of a current transformer 48, both being connected to one branch of the stator armature winding 32. Thus, the main exciter field excitation provided by the regulator 40 is generally proportional to a predetermined function of the power output of the synchronous dynamoelectric machine 10 to provide voltage regulation in the usual manner.

Figure 2:
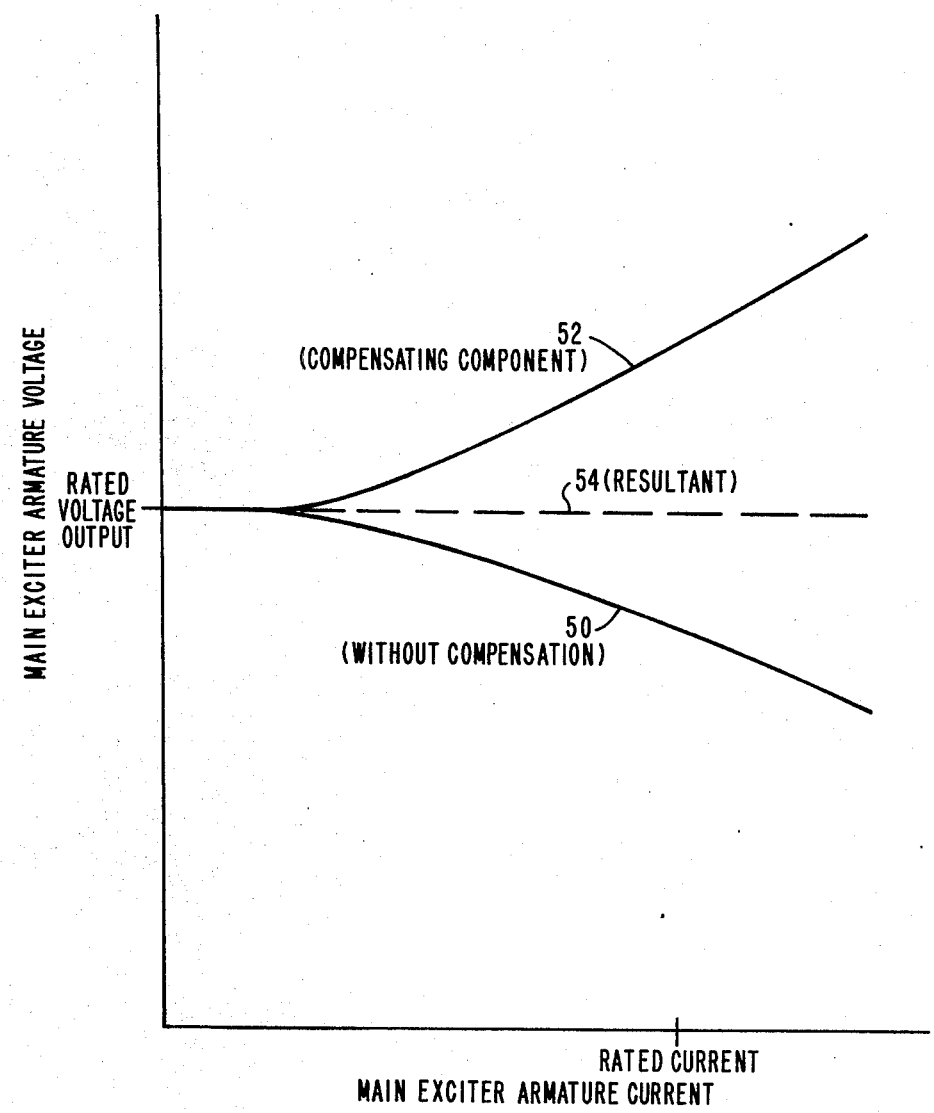
FIG. 2 is a graphical representation of a typical voltage regulation curve for the brushless exciter of FIG. 1.

Referring now to FIG. 2, a typical voltage regulation curve for the main exciter 14 is illustrated. Because of the saturation effect which is inherently characteristic of iron core machines, the voltage output of the main exciter armature winding 25 is generally represented by the curve 50 which is a non-linear function of the main exciter armature current having a negative slope. This characteristic is undesirable in power generation systems in which the magnitude of the output voltage must be closely regulated. Regulation of the output voltage is a process of controlling the voltage so that it remains at or near a particular set value. Although the regulations arrangement of the regulator 40 in combination with the voltage and current signals 42 and 44 have in some cases been entirely satisfactory for regulating the output voltage of the main exciter 14, a serious problem which sometimes occurs, especially in large exciters having large circuit inductances, is "hunting". The hunting effect may be inherent in this system because of time lags in the response caused principally by energy storage in the circuit inductances of the exciter field winding and the exciter armature winding. Thus, a sudden change in load of the main dynamoelectric machine will cause a deviation in voltage from its set value, and correction of the voltage cannot take place without the lapse of a definite time to permit readjustment of the stored energies. This time lag between the impetus and response may result in successive overshooting and undershooting of the correct voltage, representing serious oscillations about the desired value. According to the teachings of the present invention, improved regulation of the output voltage of the main exciter 14 and stablized operation of the dynamoelectric machine 10 is provided by disposing a plurality of field coils 60 around the permanent magnets 62, 64, 66, and 68 of the permanent magnet field assembly 36. The field coils 60 are connected together in series electrical relation to constitute a field winding which is operable to increase the magnetic strength of the permanent magnet members 62–68 in response to direct current excitation. According to the present invention, this direct current excitation is derived from the output of the rotating rectifier assembly 16 by current coupling means, such as a direct current regulator 70. The regulator 70 may be of any suitable construction which is operable to provide a direct current output signal which is a predetermined function of the voltage appearing across the field winding 26. It may be desirable in some cases for this output signal to be characterized as a non-linear function, for example, the square of the magnitude of the field winding voltage. The direct current output signal provided by the regulator 70 is coupled to the coils 60 by means of the conductors 72–74.

Because of the generally smaller mass of the pilot exciter 34, the circuit inductances associated with the pilot exciter armature 38 and the field coils 60 is relatively small as compared with the corresponding circuit inductances of the main exciter 14. Thus, readjustment of the stored energies in the circuit inductances of the pilot exciter can take place within a much shorter time period than can be obtained by the regulator 40 operating alone, providing a corresponding improvement in response time and regulation.

In the past, it has been the practice to increase the size of the permanent magnets in the pilot exciter to obtain sufficient forcing power to achieve a faster speed of response. According to the present invention, however, it is not necessary to increase the physical size of the permanent magnet members 62-68. In the present arrangement, the magnetic field strength of the permanent magnets is increased by means of the field coils 60. The output of the regulator 70 is coordinated with output of the regulator 40 to provide increased forcing excitation for the field coils 60 during transient operation of the dynamoelectric machine 10. By this arrangement, supplemental direct current excitation is provided to permit operation of the synchronous dynamoelectric machine 10 at a power level which exceeds its base operating level during transient loading conditions. When the synchronous dynamoelectric machine 10 is operating at a power level substantially equal to its base operating level, the excitation provided by the regulator 70 operating in combination with the regulator 40 is limited to the amount required to compensate for the saturation effects of the iron core of the main exciter 14. Thus, base excitation is provided by the pilot exciter in the usual manner, with the field coils 60 disposed about the permanent magnet providing improved regulation and increased forcing excitation.

A further advantage is provided by the field coils 60 which are disposed about the permanent magnets 62-68. Because of the counter-EMF developed within the armature winding of the pilot exciter, portions of the magnetic poles of the magnets in the permanent magnet field assembly 36 are demagnetized during operation. Thus, from time to time, it is necessary to short circuit stabilize the permanent magnets of the permanent magnet field assembly 36 to compensate for the demagnetizing effect of the counter EMF. One method of magnetizing and short circuit stabilizing the magnetic elements of such a rotor assembly is to apply momentary pulses of direct current through a winding disposed about the magnetic poles of the permanent magnets. For example, in a recent construction, twelve pulses of three seconds duration each at 250 volts and 1800 amperes direct current were applied through a winding disposed concentrically about the magnetic pole portions of the permanent magnets to provide the magnetizing and short circuit stabilizing effect. In the prior art, it is necessary to disassemble the permanent magnet elements of the pilot exciter rotor assembly and attach a field winding about each magnet to apply these pulses. However, according to the present invention, a suitable winding is disposed about the magnetic pole portions of the magnetic elements of the permanent magnet field assembly so that its disassembly is unnecessary. The conductors 72 and 74 may be conveniently disconnected from the regulator 70 and connected to a suitable direct current pulse amplifier for the magnetizing and stabilizing procedure.

It is therefore apparent that a relatively simple supplemental excitation circuit has been described which is operable to provide voltage regulation and forcing excitation in combination with a conventional regulator system for the brushless exciter of a synchronous dynamoelectric machine. While a particular embodiment of the invention has been shown and described for purposes of illustration, other arrangements and embodiments may be practiced by those skilled in the art without departing from the scope and spirit of the invention. It is not desired, therefore, that the invention be limited to the specific arrangement described herein.

I claim:

1. In a synchronous dynamoelectric machine having a rotor member disposed upon a shaft, said shaft being disposed for rotation by a prime mover, a field winding disposed on said rotor member, a main exciter having a stator member carrying a field winding and a rotor member disposed on said shaft carrying an armature winding, a rotatable rectifier assembly operable to convert alternating current to direct current having an input circuit connected to receive alternating current excitation from said main exciter armature and an output circuit connected to conduct direct current excitation through said synchronous dynamoelectric machine field winding, a pilot exciter operable to derive electrical power from the rotational energy of said shaft, said pilot exciter having a permanent magnet rotor member comprising a plurality of permanent magnets arranged in alternating magnetic polarity to establish a rotating magnetic field when said shaft is rotated, and said pilot exciter having a stator member carrying an armature winding which is coupled by magnetic induction with the magnetic field provided by said permanent magnet rotor member, the combination with said pilot exciter of a plurality of field coils disposed upon selected ones of said permanent magnets, said field coils being connected together in series electrical relation to constitute a field winding, and means for deriving direct current excitation from the output circuit of said rotating rectifier assembly connected to supply a predetermined function of said direct current excitation to said permanent magnet field winding.

2. The combination as defined in claim 1 wherein said direct current excitation deriving means comprises a direct current regulator having an input circuit connected to receive direct current excitation from the output circuit of said rotating rectifier assembly and having an output circuit connected to conduct direct current through said permanent magnet field winding.

* * * * *